E. W. KINGSLEY.
ADJUSTABLE TIRE SUPPORT.
APPLICATION FILED APR. 10, 1909.
994,644.
Patented June 6, 1911.
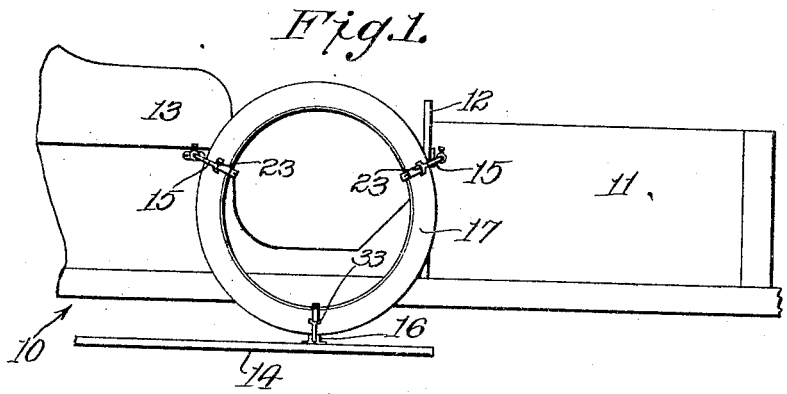
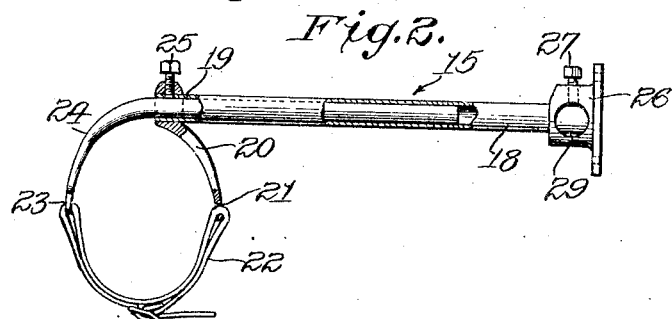
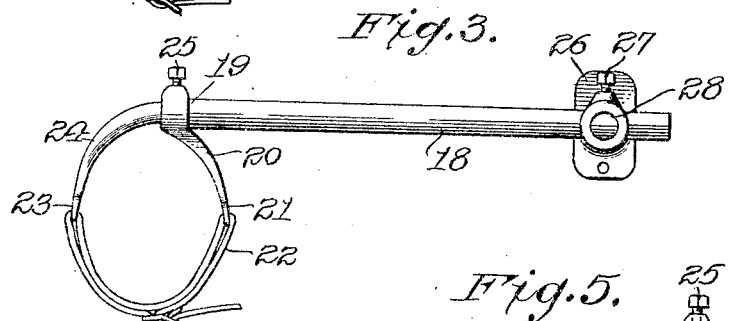
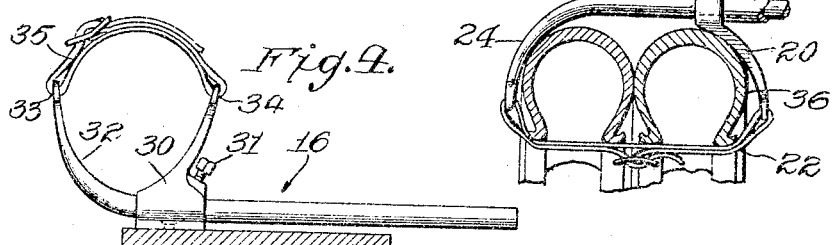
Inventor,
Earl W. Kingsley

UNITED STATES PATENT OFFICE.

EARL W. KINGSLEY, OF LOS ANGELES, CALIFORNIA.

ADJUSTABLE TIRE-SUPPORT.

994,644.

Specification of Letters Patent.

Patented June 6, 1911.

Application filed April 10, 1909. Serial No. 489,201.

*To all whom it may concern:*

Be it known that I, EARL W. KINGSLEY, a citizen of the United States, residing at Los Angeles, in the county of Los Angeles and State of California, have invented new and useful Improvements in Adjustable Tire-Supports, of which the following is a specification.

This invention relates to a means for detachably carrying a plurality of extra pneumatic tires on a motor vehicle intended for use in case of an accident to the tires secured to the vehicle wheels; and a main object thereof is to provide a set of tire supports that may be instantly adjusted to carry and support a number of tires mounted therein in a rigid manner, and which may be adjusted to the size of any single make of tires.

Another and important object is to provide a set of tire supports whose outer jaws are adjustable, thereby enabling the placement of the tires carried thereby close to the body of the vehicle.

A further object is to provide a set of tire supports that may be readily adjusted to fit different makes of motor vehicles.

I accomplish these objects by means of the device described herein and illustrated in the accompanying drawings, in which:—

Figure 1— is a diagrammatic side elevation of a portion of a motor car with my improved supports in place thereon showing a tire supported thereby. Fig. 2— is a side elevation partly in section of one of the upper supports. Fig. 3— is a side elevation of the same support described in Fig. 2 showing a different means of adjustment to the vehicle. Fig. 4— is a side elevation of the lower tire support showing its method of attachment to the "running board" of a vehicle. Fig. 5— is a detail view of the support described in Fig. 1 showing a plurality of tires mounted therein.

Referring more particularly to the drawings, 10 designates a portion of a motor vehicle provided with the usual hood 11, dash 12, forward seat 13, and running board 14.

My improved tire support preferably consists of three members, the two upper ones 15 having a plurality of adjustments, as will be more fully described hereinafter, and the lower 16 having a single adjustment. The three members forming a set are adapted to be secured and arranged to the frame and running board of a vehicle, so as to rigidly support and engage the annular tire member 17, which is here shown as consisting merely of an outer tire casing, although the device is capable of supporting a demountable rim with the tire in place thereon.

As the upper supporting members are exactly alike I will for brevity of description describe only one. Member 15 preferably consists of a metallic tube 18, the outer end 19 having a jaw 20 at right angles thereto, preferably by being brazed for the purpose of economy in manufacture. The end of jaw 20 is inclined rearwardly and is provided in the outer end thereof with a slot 21, through which passes a tire securing strap 22 that is adapted to engage a similar slot 23 formed in the outer end of a telescopic jaw 24. This jaw is maintained in a rigid adjusted relation to jaw 20 by means of a set-screw 25. Rod 18 of member 15 is adjustably mounted in a fitting 26 that is preferably attached to the dash 12 or the under portion of the frame of the forward seat 13, as clearly shown in Fig. 1 of the drawing, being held in an adjusted relation to fitting 26 by means of a set-screw 27. Fitting 26 is provided with a longitudinal opening 28 therethrough for the passage of rod 18, and also a transverse opening 29, Figs. 2 and 3 of the drawing, illustrating the method of utilizing these openings. Member 16 is preferably designed for placement on the running board 14 of the vehicle, but unlike member 15 it has only one adjustment, that of the outer jaw. This member preferably consists of a stationary jaw 30 designed to be rigidly secured to the running board or other convenient point of placement, and is provided adjacent the base thereof with a set-screw 31, by means of which the outer jaw 32 may be maintained in an adjusted relation to the stationary jaw. The outer ends of both of these jaws are provided with slots 33, 34 through which is adapted to pass an adjusting strap 35. In Fig. 5 of the drawing I have shown the outer end of member 15 adjusted, so as to support a plurality of tires 36.

It will be apparent from the foregoing description that I have provided a novel set of tire supporting arms, whereby I am enabled to carry a plurality of extra tires with great facility, the adjustment of the members enabling me to readily adapt the supports to cars of various makes. It will also be observed that the adjustability of the outer jaw permits the ready adaptation of the irons to tires of different sizes and diameters.

Having described my invention what I claim as new and desire to secure by Letters Patent is:—

1. A tire support including a base member, an inner jaw, means connecting said base member with said inner jaw and an outer jaw adjustably mounted with reference to said inner jaw, said outer jaw comprising the extreme projecting portion of said tire support.

2. A tire support comprising a base member, a tubular member mounted in said base member, a stationary jaw fixedly mounted upon said tubular member, a rod terminating in an outer adjustable jaw, said rod being adapted to slide in said tubular member and means for clamping said rod in any desired position.

3. A tire support including a fixed holding jaw, a movable holding jaw and a base member, said base member comprising an attaching portion for connecting the base with a vehicle, a projecting portion attached to said attaching portion, said projecting portion being provided with two openings at right angles to each other, a set screw adapted to pass into said openings at their point of inter-section and means connecting said base portion with said jaws.

In witness that I claim the foregoing I have hereunto subscribed my name this 30 day of March, 1909.

EARL W. KINGSLEY.

Witnesses:
  GEORGE P. LOWNEY,
  EDWARD MCEVOY.